US010509303B2

(12) United States Patent
Li

(10) Patent No.: US 10,509,303 B2
(45) Date of Patent: Dec. 17, 2019

(54) LASER PROJECTION DEVICE WITH REFLECTIVE COMPONENT AND 1/4 WAVE PLATE

(71) Applicant: Qingdao Hisense Electronics Co., Ltd., Qingdao, Shandong (CN)

(72) Inventor: Wei Li, Shandong (CN)

(73) Assignee: Qingdao Hisense Electronics Co., Ltd., Qingdao, Shandong (CN)

( * ) Notice: Subject to any disclaimer, the term of this patent is extended or adjusted under 35 U.S.C. 154(b) by 0 days.

(21) Appl. No.: 16/004,027

(22) Filed: Jun. 8, 2018

(65) Prior Publication Data
US 2019/0107771 A1 Apr. 11, 2019

(30) Foreign Application Priority Data

Oct. 10, 2017 (CN) .......................... 2017 1 0933580
Oct. 10, 2017 (CN) .......................... 2017 1 0933835

(51) Int. Cl.
G03B 21/20 (2006.01)
(52) U.S. Cl.
CPC ......... G03B 21/204 (2013.01); G03B 21/208 (2013.01); G03B 21/2066 (2013.01); G03B 21/2073 (2013.01)
(58) Field of Classification Search
CPC . G03B 21/204; G03B 21/208; G03B 21/2033
See application file for complete search history.

(56) References Cited

U.S. PATENT DOCUMENTS 8,562,146 B2 * 10/2013 Kitano ................. G03B 21/204
353/31
8,690,343 B2 * 4/2014 Tanaka ............... G03B 21/2013
348/743
(Continued)

FOREIGN PATENT DOCUMENTS

CN 103207507 A 7/2013
CN 106647126 A 5/2017
(Continued)

OTHER PUBLICATIONS

Chinese International Search Report for corresponding PCT/CN2018090435 dated Aug. 15, 2018.

*Primary Examiner* — Bao-Luan Q Le
(74) *Attorney, Agent, or Firm* — Brinks Gilson & Lione

(57) ABSTRACT

For a laser projection device, a dichroic component is disposed on a light emitting path of a laser array for receiving a first blue polarized light from the laser array. A 1/4 wave plate is disposed between a reflective component and the dichroic component and configured to receive the first blue polarized light from the dichroic component, generate a second blue polarized light, and emit the second blue polarized light to the reflective component; and further configured to receive the second blue polarized light reflected by the reflective component, generate a third blue polarized light, and emit the third blue polarized light to the dichroic component. The dichroic component is further configured to receive the third blue polarized light from the 1/4 wave plate and fluorescent light from a reflective fluorescent wheel, and output the third blue polarized light and the fluorescent light in a same light emitting direction.

15 Claims, 12 Drawing Sheets

(56) References Cited

U.S. PATENT DOCUMENTS

| | | | | |
|---|---|---|---|---|
| 8,733,940 B2* | 5/2014 | Tanaka | G03B 21/28 | 353/20 |
| 8,823,886 B2* | 9/2014 | Tanaka | G02B 27/1046 | 349/8 |
| 8,915,597 B2* | 12/2014 | Kitano | H04N 9/3105 | 353/94 |
| 9,046,745 B2* | 6/2015 | Chuang | G03B 21/005 | |
| 9,152,031 B2* | 10/2015 | Wei | G03B 21/204 | |
| 9,454,068 B2* | 9/2016 | Tanaka | H04N 9/3158 | |
| 9,500,937 B2* | 11/2016 | Tanaka | G03B 21/204 | |
| 9,568,817 B2* | 2/2017 | Akiyama | H04N 9/3164 | |
| 9,632,321 B2* | 4/2017 | Akiyama | G03B 21/204 | |
| 9,645,481 B2* | 5/2017 | Tanaka | G02B 26/007 | |
| 9,759,991 B2* | 9/2017 | Sheng | G03B 21/2073 | |
| 9,810,977 B2* | 11/2017 | Akiyama | G02B 27/102 | |
| 9,977,253 B2* | 5/2018 | Aizaki | G02B 5/3083 | |
| 10,175,566 B2* | 1/2019 | Matsubara | F21S 2/00 | |
| 10,203,593 B2* | 2/2019 | Tanaka | G02B 27/283 | |
| 2012/0127435 A1* | 5/2012 | Kitano | G03B 21/204 | 353/20 |
| 2012/0133903 A1* | 5/2012 | Tanaka | G03B 21/2013 | 353/31 |
| 2012/0140183 A1* | 6/2012 | Tanaka | G03B 21/28 | 353/20 |
| 2012/0268917 A1* | 10/2012 | Kitano | H04N 9/3105 | 362/84 |
| 2013/0002972 A1* | 1/2013 | Tanaka | G02B 27/1046 | 349/8 |
| 2013/0176540 A1* | 7/2013 | Wei | G03B 21/204 | 353/20 |
| 2014/0055754 A1* | 2/2014 | Chuang | G03B 21/005 | 353/20 |
| 2014/0168971 A1* | 6/2014 | Kurosaki | G03B 21/208 | 362/235 |
| 2014/0293232 A1* | 10/2014 | Tanaka | G03B 21/204 | 353/20 |
| 2016/0026077 A1* | 1/2016 | Tanaka | H04N 9/3158 | 353/99 |
| 2016/0077419 A1* | 3/2016 | Sheng | G03B 21/2073 | 353/20 |
| 2016/0238923 A1* | 8/2016 | Tanaka | G02B 26/007 | |
| 2018/0217486 A1* | 8/2018 | Tanaka | G02B 27/283 | |

FOREIGN PATENT DOCUMENTS

| | | |
|---|---|---|
| CN | 107505807 A | 12/2017 |
| CN | 107544202 A | 1/2018 |
| JP | 2012078488 A | 4/2012 |
| JP | 2014021223 A | 2/2014 |

* cited by examiner

LASER PROJECTION DEVICE WITH REFLECTIVE COMPONENT AND 1/4 WAVE PLATE

CROSS-REFERENCE TO RELATED APPLICATIONS

The present application claims priority to Chinese Patent Application No. 201710933580.3, filed on Oct. 10, 2017, entitled "LASER LIGHT SOURCE AND PROJECTION DISPLAY DEVICE", and Chinese Patent Application No. 201710933835.6, filed on Oct. 10, 2017, entitled "LASER LIGHT SOURCE AND PROJECTION DISPLAY DEVICE", all of which are incorporated herein by reference in their entireties.

FIELD OF THE TECHNOLOGY

The present disclosure relates to the field of laser display technologies and, in particular, to a laser projection device.

BACKGROUND

With the continuous improvement of market demand, projectors with high brightness, large size and high resolution have received more and more attention from the market. The laser light source is applied to projector technologies because of its high luminous power per unit area, long service life and good color. However, due to characteristics such as immaturity technology and low efficiency of green laser arrays, phosphors are usually used in the laser light source, and fluorescence with a color such as green is emitted through laser excitation of the phosphors, thereby providing a projector with red light (R light), green light (G light) and blue light (B light).

At present, a laser projection device commonly used, as shown in FIG. 1, includes a laser array 1; a diffusion sheet 2 disposed in a light emitting direction of the laser array 1; and a dichroscope 3 disposed in a light emitting direction of the diffusion sheet 2 and forming a 45° angle with the light emitting direction of the diffusion sheet 2; a fluorescent wheel 5 disposed in a light emitting direction of the dichroscope 3, where the fluorescent wheel 5 is provided with a laser transmission region and a phosphor-coated fluorescent region; a relay loop 7 disposed around the fluorescent wheel 5, where the relay loop 7 is a light path conversion system consisting of three lenses and three reflectors; and a color filter wheel 8 disposed on a side of the dichroscope 3 and disposed parallel to the light emitting direction of the laser array 1; and a homogenization component 9 disposed in a light emitting direction of the color filter wheel 8. In addition, two collimation components are further included, where a collimation component 4 is disposed between the dichroscope 3 and the fluorescent wheel 5, and a collimation component 6 is disposed between the fluorescent wheel 5 and the relay loop 7. In use, the laser emitted from the laser array 1, after passing through the diffusion sheet 2, forms a circular Gaussian beam, which passes through the dichroscope 3 to be irradiated onto the rotated fluorescent wheel 5 after being collimated by the collimation component 4. When the laser is irradiated to the laser transmission region, the laser passing through the laser transmission region is steered by the relay loop 7 after being collimated by the collimation unit 6, and enters into the homogenization component 9 for homogenization via the color filter wheel 8. When the laser is irradiated to the fluorescent region, the fluorescent region is excited by the laser to emit a fluorescent light, and the excited fluorescent light is irradiated to the dichroscope 3 after passing through the collimation component 4, which is reflected by the dichroscope 3 to the color filter wheel 8 for filtration, and the filtered fluorescent light also enters into the homogenization component 9 for homogenization, and then is collimated by the collimating lens 10. As the fluorescent wheel 5 rotates, a square spot of laser and fluorescent light is continuously obtained from the light output of the collimating lens 10. The laser and the fluorescent light emitted from the collimating lens 10 are imaged on a display chip of a light machine, and finally an image output is achieved through the lens 13. The display chip may be one of a Liquid Crystal Display (LCD) chip, a Digital Micromirror Device (DMD) chip and a Liquid Crystal on Silicon (LCOS) chip. Taking a light machine part composed of the DMD chip as an example, the laser projection device comprise a light source part and the light machine part, the laser and fluorescent light emitted from the light source part are transmitted to the interior of the light machine, a total reflection occurs on a first inclined surface 121 of a total internal reflection (TIR) prism group 12 inside the light machine with reflections to the DMD 11, and finally an image output is achieved via the imaging lens 13.

SUMMARY

Some embodiments of the present disclosure provide a laser projection device including a laser array that is configured to emit at least a first blue polarized light, a reflective fluorescent wheel, a reflective component, a dichroic component disposed on a light path between the laser array and the reflective fluorescent wheel, and a 1/4 wave plate disposed between the reflective component and the dichroic component.

The dichroic component may be disposed on a light emitting path of the laser array for receiving the first blue polarized light from the laser array, the 1/4 wave plate may be configured to receive the first blue polarized light from the dichroic component, generate a second blue polarized light, and emit the second blue polarized light to the reflective component, and may be further configured to receive the second blue polarized light reflected by the reflective component, generate a third blue polarized light, and emit the third blue polarized light to the dichroic component.

The dichroic component may be further configured to receive the third blue polarized light from the 1/4 wave plate and a fluorescent light from the reflective fluorescent wheel, and output the third blue polarized light and the fluorescent light in a same light emitting direction, where polarization directions of the first blue polarized light and the third blue polarized light are perpendicular, and the dichroic component transmits one of the first blue polarized light and the third blue polarized light and can reflect the other of the first blue polarized light and the third blue polarized light.

It should be understood that both the foregoing general description and the following detailed description are exemplary and explanatory, and are not intended to limit the present disclosure.

BRIEF DESCRIPTION OF THE DRAWINGS

In order to more clearly illustrate the technical solutions of the present disclosure, drawings used in the embodiments will be briefly described hereunder. It will be obvious to persons skilled in the art that other drawings can also be obtained from these drawings without any creative effort.

DETAILED DESCRIPTION

In the laser projection device provided in the related art, after the laser is transmitted through the laser transmission region of the fluorescent wheel 5, it still needs to be steered by the relay loop so as to enter the homogenization component 9 via the color filter wheel 8, and the relay loop 7 consists of three lenses and three reflectors, the light path structure of which is complex.

Some embodiments of the present disclosure provide a laser projection device, which solves the problem in the related art, i.e. a complex structure of the light path, resulting from the fact that the laser still needs to be steered by the relay loop after being transmitted through the fluorescent wheel.

It should be noted that, in the present disclosure, "transmitting" refers to that a light passes through an object, which is transparent to the light, and then exits the object.

Figure 1:
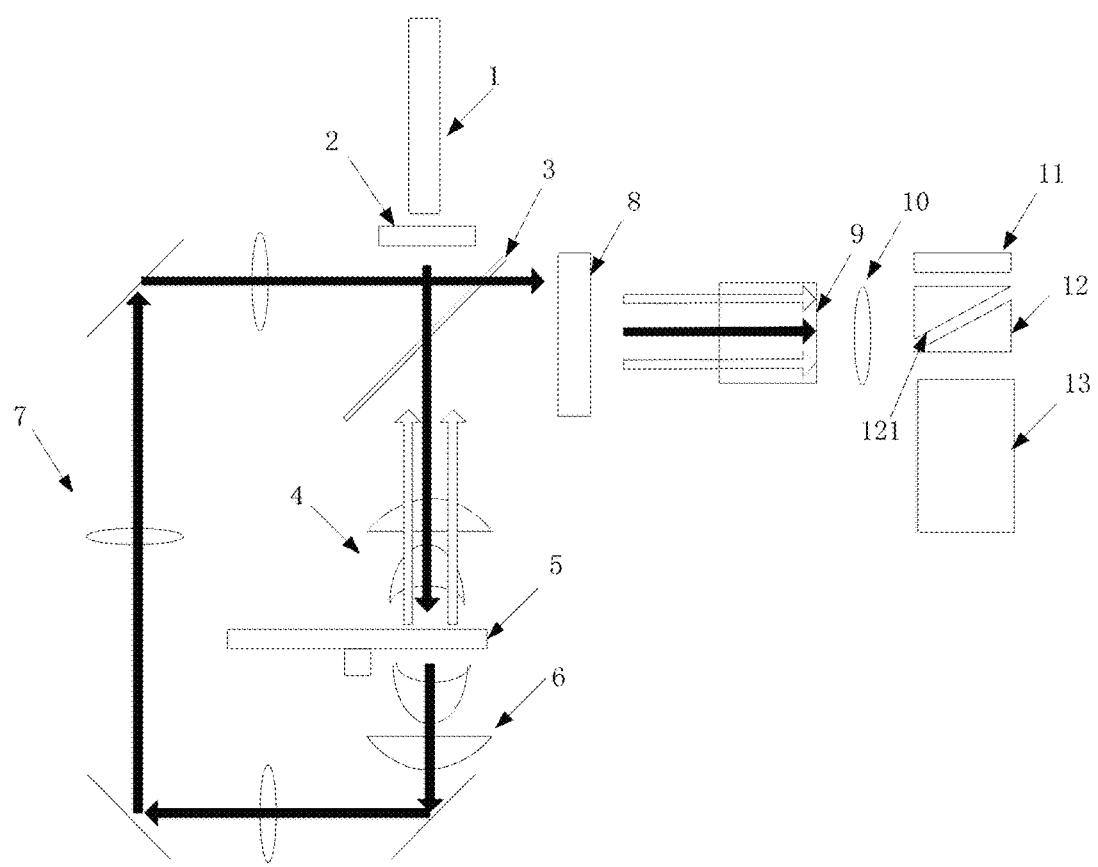
FIG. 1 shows a schematic structural diagram of a projection display device provided in the related art.
Figure 2:
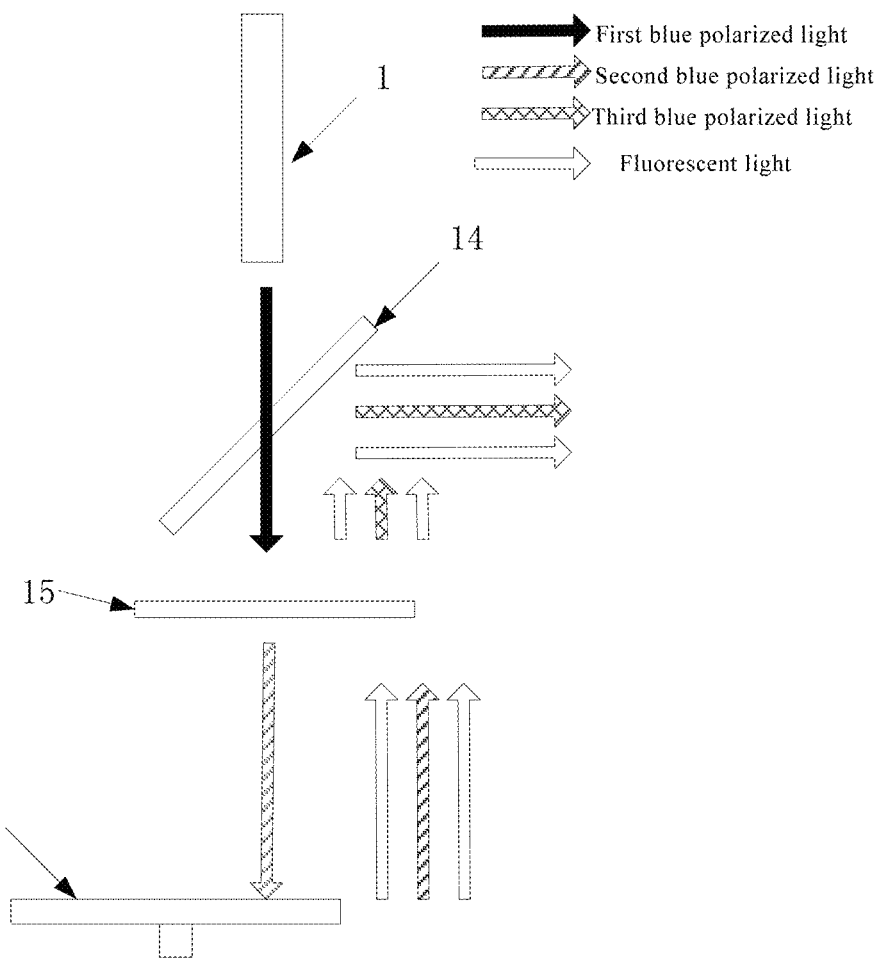
FIG. 2 shows a schematic structural diagram of a laser projection device provided in some embodiments of the present disclosure.

Some embodiments of the present disclosure provide a laser projection device, as shown in FIG. 2, including a laser array 1, a reflective fluorescent wheel 16, and a dichroic component 14 and a 1/4 wave plate 15 sequentially disposed between the laser array 1 and the reflective fluorescent wheel 16. In some embodiments, the dichroic component 14 is obliquely disposed relative to a light emitting direction of the laser array 1. In some embodiments, an angle between a plane where the dichroic component 14 is located and the light emitting direction of the laser array 1 may be 45°.

In the above laser projection device, the transmission path of the laser is as follows:

The laser array 1 is configured to emit at least a first blue polarized light, and the first blue polarized light may be P light or S light. In some embodiments, the laser array 1 may be a single color laser array, such as a blue laser array which may emit a first blue polarized light, or a dual color laser array, such as a blue laser array and a red laser array which respectively provide a first blue polarized light and a first red polarized light.

In some embodiments of the present disclosure, the first blue polarized light emitted from the laser array 1 is irradiated on the dichroic component 14, and the dichroic component 14 may transmit the first blue polarized light to the 1/4 wave plate 15. The dichroic component 14 transmitting the first blue polarized light to the 1/4 wave plate 15 may for example refers to that the dichroic component 14 is transparent to the first blue polarized light irradiated on the dichroic component 14, and the first blue polarized light passes through the dichroic component 14 and then exits the dichroic component 14 to the 1/4 wave plate 15. In some embodiments of the present disclosure, the first blue polarized light is reflected by the dichroic component 14.

The 1/4 wave plate 15 receives the first blue polarized light transmitted by the dichroic component 14, and changes the first blue polarized light by a 1/4 phase difference and generates a second blue polarized light. That is, after the first blue polarized light is transmitted through the 1/4 wave plate 15, its polarization direction is rotated by 45° to generate the second blue polarized light. The second blue polarized light may include circular polarized light. In some embodiments, if the first blue polarized light is P light, its polarization direction is rotated by 45° to generate circular polarized light when the P light passes through the 1/4 wave plate 15.

Figure 3:
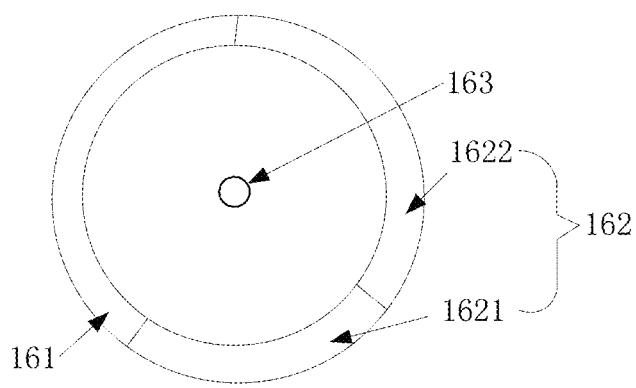
FIG. 3 shows a schematic structural diagram of a reflective fluorescent wheel provided in some embodiments of the present disclosure.

The 1/4 wave plate 15 is configured to emit the generated second blue polarized light to the reflective fluorescent wheel 16. As shown in FIG. 3, the reflective fluorescent wheel 16 has a circular structure, which is provided with a rotating axis 163 at its central axis. A rotating plane is disposed perpendicular to the incident laser beam. The reflective fluorescent wheel 16 is provided, in its circumferential direction, with a laser reflection region 161 serving as a reflective component and a fluorescent reflection region 162. The laser reflection region 161 is configured to receive the second blue polarized light from the 1/4 wave plate 15 and reflect it to the 1/4 wave plate 15; the fluorescent reflection region 162 is configured to receive the second blue polarized light from the 1/4 wave plate 15, generate a fluorescent light and reflect the fluorescent light to the 1/4 wave plate 15.

In some embodiments, a substrate of the reflective fluorescent wheel 16 may be an aluminum substrate, and the aluminum substrate may reflect light in a visible light band. The laser reflection region 161 may be directly a part of the aluminum substrate, and the reflective fluorescent wheel 16 may be coated with a phosphor with a target color at a side close to the 1/4 wave plate 15, for example, the target color is green, and then a part of the reflective fluorescent wheel 16 is coated, at the side close to the 1/4 wave plate 15, with a green phosphor to serve as the fluorescent reflection region 162.

In some embodiments, the substrate of the reflective fluorescent wheel 16 may be a transparent substrate, and the transparent substrate may be provided with a high reflection film which is in the wave band of the laser to serve as the laser reflection region 161; the transparent substrate may be provided with a high reflection film which is in the wave band of the fluorescent light at a side away from the 1/4 wavelength plate 15, and a phosphor with a target color is coated at a side close to the 1/4 wavelength plate 15 to serve as the fluorescent reflection region 162. When the second blue polarized light is irradiated to the high reflection film which is in the wave band of the laser in the laser reflection region 161, the second blue polarized light is reflected by the high reflection film onto the 1/4 wave plate 15; when the second blue polarized light is irradiated to the fluorescent reflection region, the phosphor with the target color is excited to emit a fluorescent light which is also reflected to the 1/4 wave plate 15 under the reflection of the high reflection film in the wave band of the fluorescent light.

In some embodiments of the present disclosure, the reflective fluorescent wheel 16 may be driven to rotate along its rotating axis 163, a rotation plane of the laser reflection region and the fluorescent reflection region is arranged perpendicular to the incident laser beam. With the rotation of the reflective fluorescent wheel 16, for a period of time, the laser reflection region 161 may reflect the second blue polarized light to the 1/4 wave plate 15 when the second blue polarized light is irradiated to the laser reflection region 161; and for another period of time, the fluorescent reflection region 162 may be excited to emit the fluorescent light and reflects the fluorescent light to the 1/4 wave plate 15 when the second blue polarized light is irradiated to the fluorescent reflection region 162. Therefore, with the rotation of the reflective fluorescent wheel 16, the second blue polarized light and the fluorescent light are continuously obtained at the side close to the 1/4 wave plate 15, and the reflective fluorescent wheel 16 may be prevented from generating excessive heat to affect its service life due to continuous irradiations at the same place thereon.

In some embodiments, when the laser array 1 is a blue laser array, the fluorescent reflection region 162 may be provided with a green fluorescent reflection region 1621 and a yellow fluorescent reflection region 1622, where the green fluorescent reflection region 1621 is provided with a green phosphor and the yellow fluorescent reflection region 1622 is provided with a yellow phosphor. When the second blue polarized light is irradiated to the green fluorescent reflection region 1621, the green phosphor may be excited to emit green fluorescence which is reflected to the 1/4 wave plate 15; when the second blue polarized light is irradiated to the yellow fluorescent reflection region 1622, the yellow phosphor may be excited to emit yellow fluorescence which is reflected to the 1/4 wave plate 15. With the rotation of the reflective fluorescent wheel 16, blue lasers, green fluorescence, and yellow fluorescence are continuously reflected to the 1/4 wave plate 15.

The 1/4 wave plate 15 receives the second blue polarized light and the fluorescent light from the reflective fluorescent wheel 16, changes the second blue polarized light by a 1/4 phase difference and generates a third blue polarized light. That is, after the second blue polarized light passes through the 1/4 wave plate 15, its polarization direction is rotated by 45° to generate a third blue polarized light, and the polarization direction of the third blue polarized light is perpendicular to the polarization direction of the first blue polarized light. When the first blue polarized light is S light, the third blue polarized light is P light; and when the first blue polarized light is P light, the third blue polarized light is S light.

The 1/4 wave plate 15 is configured to emit the generated third blue polarized light to the dichroic component 14, meanwhile, the 1/4 wave plate 15 may also be configured to emit the fluorescent light from the reflective fluorescent wheel 16 to the dichroic component 14.

In some embodiments of the present disclosure, as the dichroic component 14 transmits the first blue polarized light, the dichroic component 14 may reflect the third blue polarized light and the fluorescent light transmitted from the 1/4 wave plate 15 to provide light for a display chip. With the rotation of the reflective fluorescent wheel 16, the dichroic component 14 continuously provides laser and fluorescent light to the display chip. The display chip may be an LCD, a DMD or an LCOS.

In some embodiments, the dichroic component 14 includes a substrate, and the substrate is provided with a coated layer at a side close to the laser array 1. The coated layer is configured to transmit the first blue polarized light and can reflect the third blue polarized light. The substrate is provided with a dichroic film at a side close to the reflective fluorescent wheel 16, and the dichroic film is configured to transmit blue light and reflect the fluorescent light transmitted from the 1/4 wave plate 15. The third blue polarized light and the fluorescent light have their light paths steered after passing through the dichroic component 14, therefore, the dichroic component 14 also has a light path steering effect.

In some embodiments, the coated layer may be a hafnium oxide coated layer or a silicon dioxide coated layer. With a rational design, the hafnium oxide coated layer and the silicon dioxide coated layer may make the transmittance of the first blue polarized light more than 99%, and the transmittance of the third blue polarized light within 1%; the dichroic film may also be a hafnium oxide coated layer or a silicon dioxide coated layer. With a rational design, the hafnium oxide coated layer and the silicon dioxide coated layer may make the transmittance of the fluorescent light in the target band within 1%, and more than 99% of the fluorescent light is reflected out when being reflected by the dichroic film.

In some embodiments, if the first blue polarized light is P light, then the second blue polarized light may be circular polarized light, and the third blue polarized light may be S light. A polarized film disposed on the dichroic component 14 at a side close to the laser array 1 is configured to transmit P light and reflect S light, and a dichroic film disposed on the dichroic component 14 at a side close to the reflective fluorescent wheel 16 reflects the fluorescent light transmitted from the 1/4 wave plate 15. The P light emitted from the laser array 1 is irradiated on the dichroic component 14, and generates circular polarized light after passing through the 1/4 wave plate 15. The circular polarized light is reflected to the 1/4 wave plate 15 again after passing through the laser reflection region 161 of the reflective fluorescent wheel 16. S light is generated after the circular polarized light passes through the 1/4 wave plate 15. The S light is irradiated on the dichroic component 14, and the light path of the S light is steered using the effect that the coated layer of the dichroic component 14 reflects S light, thereby providing a blue laser to the display chip.

Figure 4:
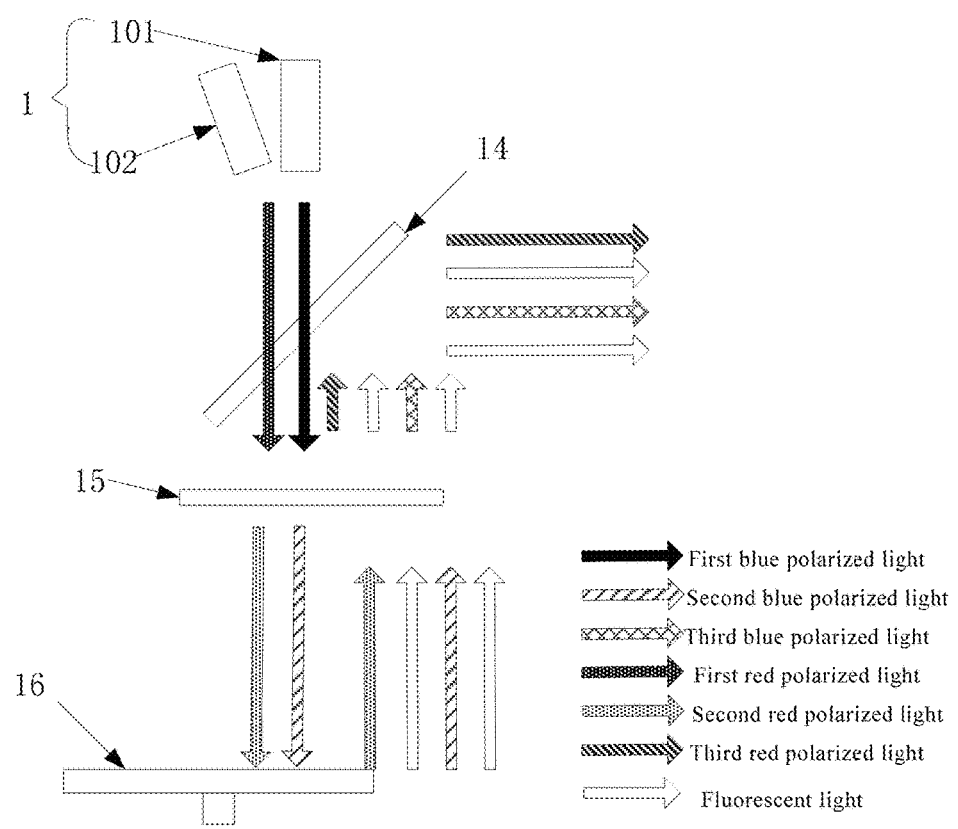
FIG. 4 shows a schematic structural diagram of a laser projection device provided in further embodiments of the present disclosure.

In some embodiments, as shown in FIG. 4, when the laser array 1 is a dual color laser array, that is, when the laser array 1 includes a blue laser array 101 and a red laser array 102, the first red polarized light emitted from the red laser array 102 is irradiated to the dichroic component 14, and the dichroic component 14 may transmit the first red polarized light to the 1/4 wave plate 15 along with the first blue polarized light.

The 1/4 wave plate 15 receives the first red polarized light transmitted by the dichroic component 14, rotates a polarization direction of the first red polarized light by 45° to generate a second red polarized light, and emits the generated second red polarized light to the reflective fluorescent wheel 16.

When the second red polarized light is irradiated to the laser reflection region 161 of the reflective fluorescent wheel 16, the laser reflection region 161 reflects the second red polarized light to the 1/4 wave plate 15.

The 1/4 wave plate 15 receives the second red polarized light reflected from the laser reflection region 161 and rotates a polarization direction of the second red polarized light by 45° to generate a third red polarized light, and emits the third red polarized light to the dichroic component 14.

The dichroic component 14 reflects the third red polarized light to provide a red laser to the display chip along with the third blue polarized light.

In some embodiments, the first red polarized light may be P light or S light. Correspondingly, the third red polarized light may be S light or P light, and the second red polarized light may be red circular polarized light. However, it should be noted that the polarization of the first red polarized light must be the same as the polarization of the first blue polarized light, that is, when the first blue polarized light is P light, the first red polarized light is also P light; when the first blue polarized light is S light, the first red polarized light is also S light.

Since the laser array 1 is a dual color laser array, the laser projection device may provide a blue laser and a red laser to the display chip. Therefore, the fluorescent reflection region 162 of the reflective fluorescent wheel 16 may only include the green fluorescent reflection region. When the second blue polarized light is irradiated to the green fluorescent reflection region, green fluorescence is excited and provided to the display chip.

In the laser projection device provided in some embodiments of the present disclosure, the first blue polarized light emitted from the laser array is pass through the dichroic component and irradiated on the 1/4 wave plate, and the first blue polarized light is rotated by 45° in its polarization direction after passing though the 1/4 wave plate to generate the second blue polarized light. When the second blue polarized light is irradiated on the laser reflection region which serves as a reflection member of the reflective fluorescent wheel, the second blue polarized light is rotated by 45° in the polarization direction after being reflected by the laser reflection region and passing through the 1/4 wave plate to generate a third blue polarized light with the polarization direction perpendicular to the polarization direction of the first blue polarized light, and the third blue polarized light is reflected out under the reflection of the dichroic component. When the second blue polarized light is irradiated on the fluorescent reflection region of the reflective fluorescent wheel, the fluorescent light is generated, which is irradiated to the dichroic component after passing through the 1/4 wave plate and reflected out under the reflection of the dichroic component. With the continuous rotation of the reflective fluorescent wheel, the laser projection device continuously provides laser and fluorescent light. According to the laser projection device provided in some embodiments of the present disclosure, with a design of the dichroic component and the 1/4 wave plate, the laser and the fluorescent light reflected by the reflective fluorescent wheel share the 1/4 wave plate, the light paths of which are steered via the dichroic component, thus the light path structure is simple, the number of optical components is small, and the loss of the laser is greatly reduced, and thus the laser utilization of the light source is greatly improved.

Figure 5:
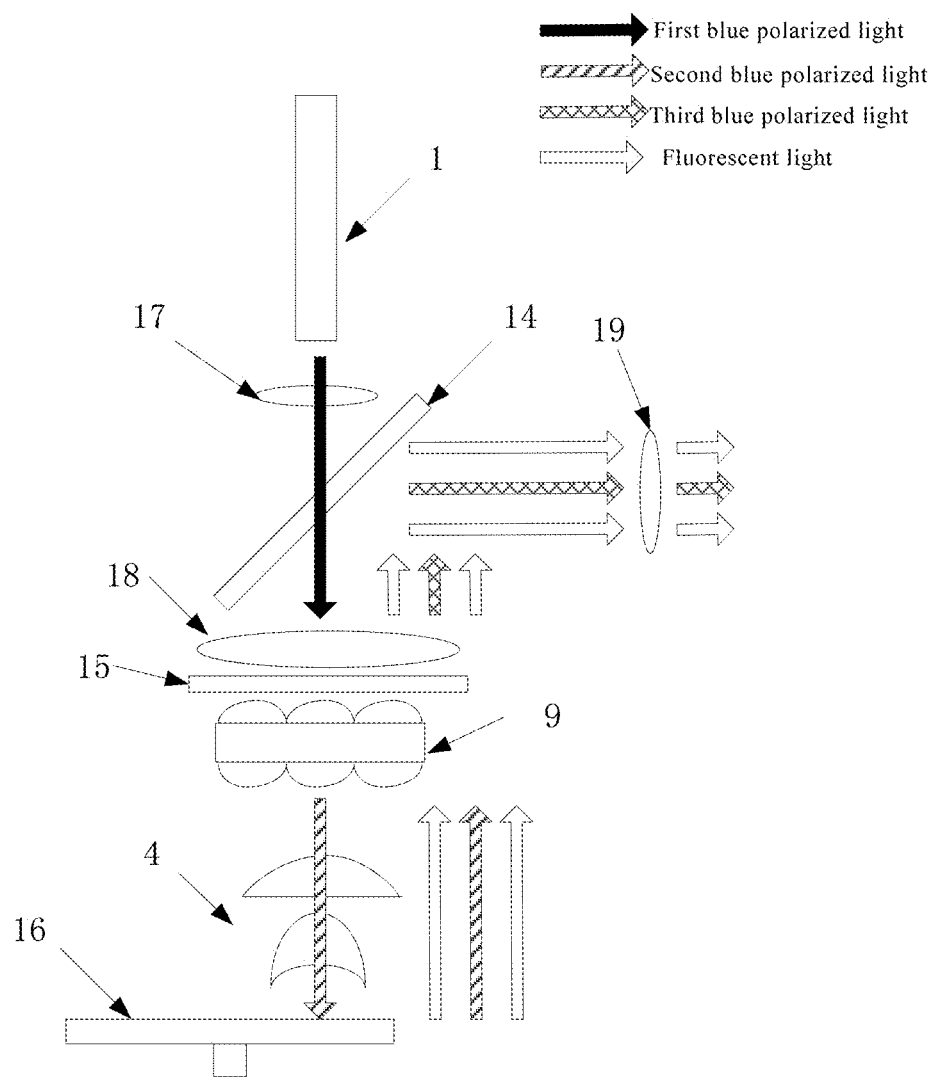
FIG. 5 shows a schematic structural diagram of a laser projection device provided in further embodiments of the present disclosure.

A laser projection device provided in further embodiments of the present disclosure differs from that in the embodiments of FIG. 2 in that, as shown in FIG. 5, the laser projection device further includes a homogenization component 9 disposed between the 1/4 wave plate 15 and the reflective fluorescent wheel 16.

In a laser transmission light path, there are often more optical lenses for collimation, focusing, etc. In some embodiments, as shown in FIG. 5, the laser projection device further includes a collimation component 4 disposed between the homogenization component 9 and the reflective fluorescent wheel 16.

The second blue polarized light transmitted from the 1/4 wave plate 15 is homogenized by the homogenization component 9 to form a laser beam with a cross-section of a square homogenized light spot. With the rotation of the reflective fluorescent wheel 16, the laser beam, after being collimated by the collimation component 4, is irradiated onto the laser reflection region of the reflective fluorescent wheel 16 to form a square homogenized light spot, and after being reflected, is collimated by the collimation component 4 and homogenized by the homogenization component 9, which generates the third blue polarized light with a cross-section of a square homogenized light spot after passing through the 1/4 wave plate 15. The third blue polarized light is reflected by the dichroic component 14, and is finally imaged on the display chip. The laser beam, after being collimated by the collimation component 4, is irradiated to the fluorescent reflection region of the reflective fluorescent wheel 16, a square homogenized light spot is formed on the fluorescent reflection region, and a fluorescent light is excited, which after being reflected, is collimated by the collimation component 4, homogenized by the homogenization component 9, is transmitted through the 1/4 wave plate, reflected by the dichroic component 14, and finally is also imaged on the display chip.

Figure 6:
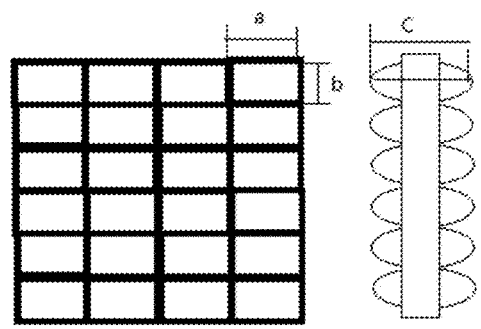
FIG. 6 shows a schematic structural diagram of a homogenization component provided in some embodiments of the present disclosure.

In some embodiments, the homogenization component 9 may be a double-sided fly-eye lens, as shown in FIG. 6. In order to match the size of the image formed on the display chip with the aspect ratio of the display chip, a length and a width of a single lens in the double-sided fly-eye lens and a thickness of the double-sided fly-eye lens satisfy: $a/c<0.2$, $b/c<0.2$, where a is the length of the single lens, b is the width of the single lens, and c is the thickness of the double-sided fly-eye lens. If a convex surface of the double-sided fly-eye lens close to the 1/4 wave plate 15 is a first convex surface, a convex surface close to the collimation component 4 is a second convex surface, the second blue polarized light emitted from the 1/4 wave plate 15 is focused when passing through the first convex surface of the fly-eye lens, and the light beam is compressed by the second convex surface serving as a field lens when passing through the second convex surface. However, the second blue polarized light emitted by the collimation component 4 is focused when passing through the second convex surface of the double-sided fly-eye lens, and the light beam is compressed by the first convex surface serving as a field lens when passing through the first convex surface.

Figure 7:
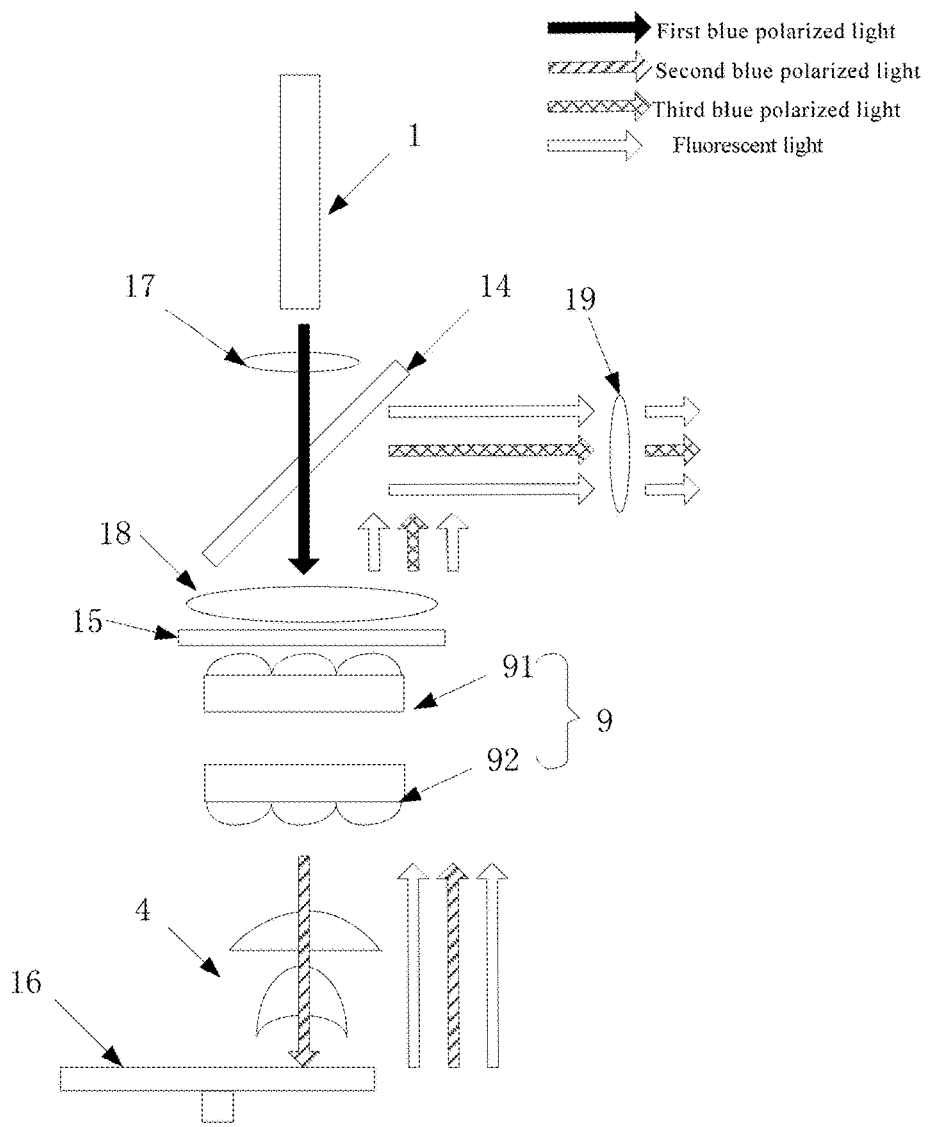
FIG. 7 shows a schematic structural diagram of a laser projection device provided in further embodiments of the present disclosure.

In further embodiments, the homogenization component 9 may also be two single-sided fly-eye lenses arranged in sequence, as shown in FIG. 7, including a first single-sided fly-eye lens 91 and a second single-sided fly-eye lens 92 arranged in sequence. A convex surface of the first single-sided fly-eye lens 91 faces the 1/4 wave plate 15, and a convex surface of the second single-sided fly-eye lens 92 faces the reflective fluorescent wheel 16.

Figure 8:
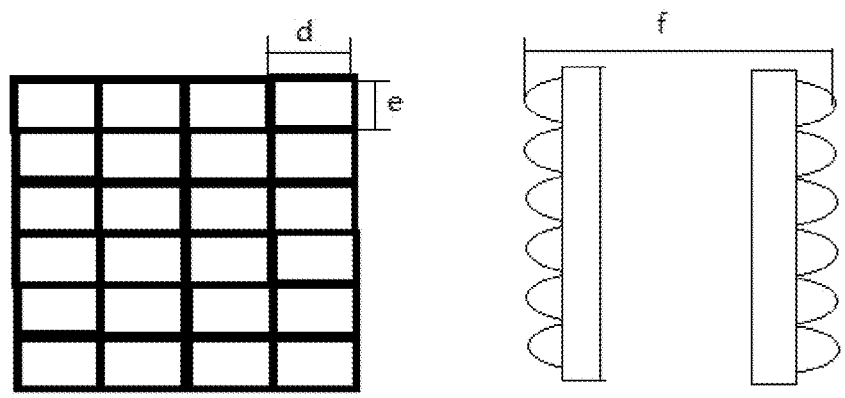
FIG. 8 shows a schematic structural diagram of a homogenization component provided in further embodiments of the present disclosure.

In order to match the size of the image formed on the display chip with the aspect ratio of the display chip, as shown in FIG. 8, a length and a width of a single lens in the single-sided fly-eye lens and an interval between the convex surfaces of two single-sided fly-eye lenses satisfy: $d/f<0.2$, $e/f<0.2$, where d is the length of the single lens in the single-sided fly-eye lens, e is the width of the single lens in the single-sided fly-eye lens, and f is the interval between the convex surfaces of the two single-sided fly-eye lenses.

In some embodiments, the laser projection device further includes a first lens group 17, a second lens group 18 and a third lens group 19 in order to make the size of the image obtained on the display chip coincide with the size of the square homogenized light spot.

The first lens group 17 is disposed between the laser array 1 and the dichroic component 14 for collimating the laser beam emitted from the laser array 1; the second lens group 18 is disposed between the dichroic component 14 and the 1/4 wave plates 15 for focusing the first blue polarized light from the dichroic component 14. The first lens group 17 and the second lens group 18 constitute a telescope zoom system zooming in or zooming out the light spot of the laser beam emitted from the laser array 1 and converting the beam into substantially parallel light.

The third lens group 19 is disposed on a side of the dichroic component 14 which is close to the display chip for focusing the third blue polarized light and fluorescent light from the dichroic component 14 and transmitting them to the display chip. The second lens group 18 and the third lens group 19 constitute an illumination imaging system imaging an image of the homogenization component on the display chip and with a uniform image imaged.

In some embodiments of the present disclosure, the second blue polarized light is homogenized by the homogenization component between the 1/4 wave plate and the collimation component, such that the light spot of the laser beam irradiated to the reflective fluorescent wheel is a square homogenized light spot which is zoomed in or zoomed out by the telescope zoom system consisting of the first lens group and the second lens group, and that a uniform square light spot is available on the display chip via the illumination imaging system consisting of the second lens group and the third lens group.

Figure 9:
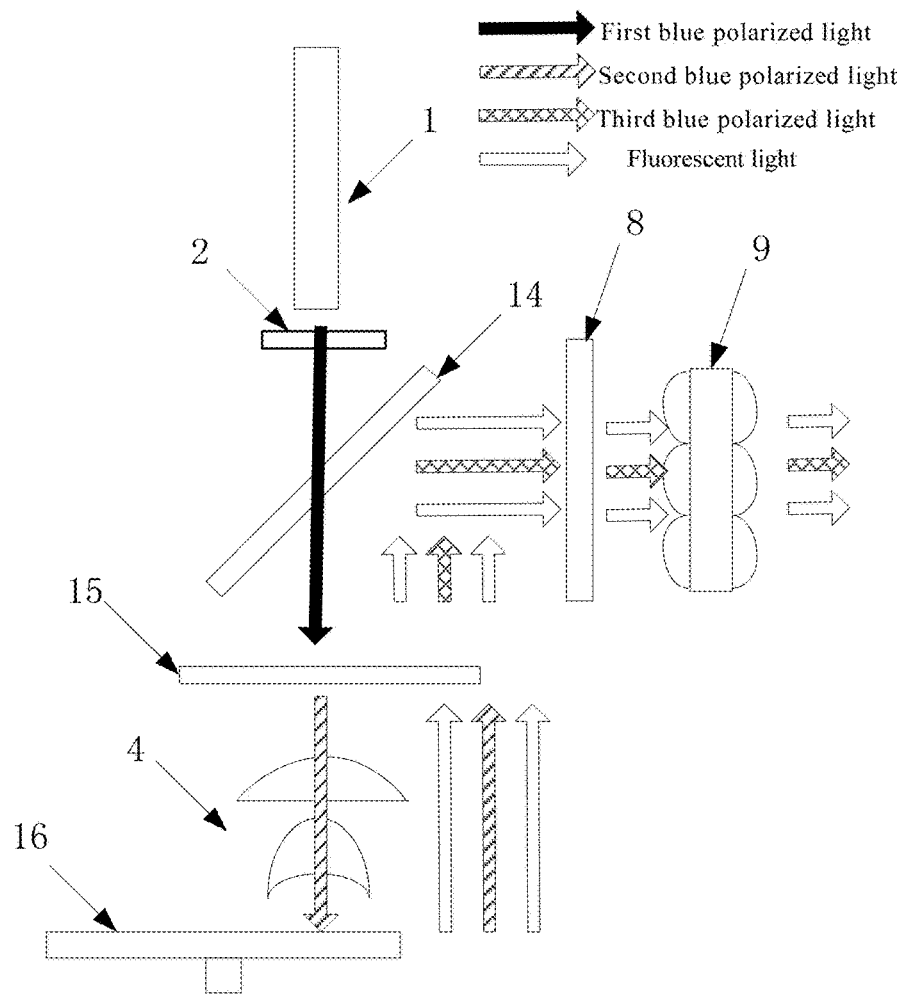
FIG. 9 shows a schematic structural diagram of a laser projection device provided in further embodiments of the present disclosure.

A laser projection device provided in further embodiments of the present disclosure differs from that in the embodiments of FIG. 2 in that, as shown in FIG. 9, the laser projection device further includes a diffusion sheet 2 disposed between the laser array 1 and the dichroic component 14, and a homogenization component 9 disposed in a light emitting direction of the dichroic component 14.

The diffusion sheet 2 is configured to convert the laser beam emitted from the laser array into a circular Gaussian beam. The diffusion sheet 2, after converting the laser beam emitted from the laser array into the circular Gaussian beam, transmits the converted circular Gaussian beam to the dichroic component 14, so that the dichroic component 14 obtains a substantially parallel laser beam.

The homogenization component 9 is configured to homogenize the third blue polarized light and the fluorescent light reflected by the dichroic component 14, and to emit the homogenized third blue polarized light and the fluorescent light to the display chip such that the display chip obtains the laser and the fluorescent light with cross-sections of square homogenized light spots.

In some embodiments, the homogenization component 9 may be a fly-eye lens or a homogenized light stick.

According to the laser projection device provided in some embodiments of the present disclosure, the laser beam emitted from the laser array is converted into a circular Gaussian beam via the diffusion sheet, such that the laser beam irradiated to the dichroic component is substantially parallel light, and the substantially parallel light is still substantially parallel light after passing through the 1/4 wave plate, and is focused on the reflective fluorescent wheel by the collimation component, this is advantageous to increase an optical power density of the reflective fluorescent wheel 16 and increase a conversion efficiency of the fluorescent light; in addition, the dichroic component is provided with a homogenization component at a side close to the display chip, such that the display chip obtains a laser beam with a cross-section of a square homogenized light spot.

In some embodiments, a color filter wheel 8 may be further arranged in front of the homogenization component 9.

In some embodiments, the color filter wheel 8 is a transparent substrate provided with a color filter film, and the color filter wheel 8 may be provided with color filter films in a plurality of wave bands. When a laser and fluorescent light are irradiated to the color filter wheel 8, the laser and the fluorescent light with a target wave band may be emitted from the color filter films to the homogenization component 9. The laser and fluorescent light with a wave band other than the target wave band are reflected or absorbed by the color filter films, which cannot reach the homogenization component 9, thus color filtering is realized for the laser and fluorescent light. The color filter films are films that perform a reflection or absorption function for a wave band other than the target wave band, and perform an antireflection function for the target wave band. For example, a target band of green light is 470 to 590 nm, and the color filter film on the color filter wheel 8 for green light allows the green light in the wave band of 470 to 590 nm to pass through, but reflects or absorbs the green light other than the wave band of 470 to 590 nm.

In some embodiments of the present disclosure, the color filter wheel 8 is driven to rotate, its rotated central axis may be arranged perpendicular to the third blue polarized light reflected by the dichroic component 14, and the color filter wheel 8 rotates in synchronization with the reflective fluorescent wheel 16. In some embodiments, corresponding to the reflective fluorescent wheel 16, color filter films in a plurality of wave bands may be disposed along the circumferential direction of the color filter wheel 8, respectively.

In some embodiments of the present disclosure, when the light reflected by the dichroic component 14 includes a blue laser, green fluorescent light and yellow fluorescent light, a blue light color filter film, a green light color filter film and a red light color filter film may be disposed along the circumferential direction of the color filter wheel 8. The color filter wheel 8 rotates in synchronization with the reflective fluorescent wheel 16, and the blue laser reflected by the dichroic component 14 is irradiated on the blue light color filter film of the color filter wheel 8. The blue light color filter film may perform color filtering on the blue laser. The color filtered blue laser is emitted to the homogenization component 9. The green fluorescent light reflected by the dichroic component 14 is irradiated on the green light color filter film of the color filter wheel 8. The green light color filter film may perform color filtering on the green fluorescent light. The color filtered green fluorescent light is emitted to the homogenization component 9. The yellow fluorescent light reflected by the dichroic component 14 is irradiated on the red light color filter film of the color filter wheel 8, and a red fluorescent light is excited while the yellow fluorescent light is filtered out. Then, the red fluorescent light is emitted onto the homogenization component 9.

Through an arrangement of the color filter wheel in front of the homogenization component, not only the yellow light can be converted into red light, but also the purity of the laser and the Green fluorescent light obtained by the display chip can be effectively improved.

Figure 10:
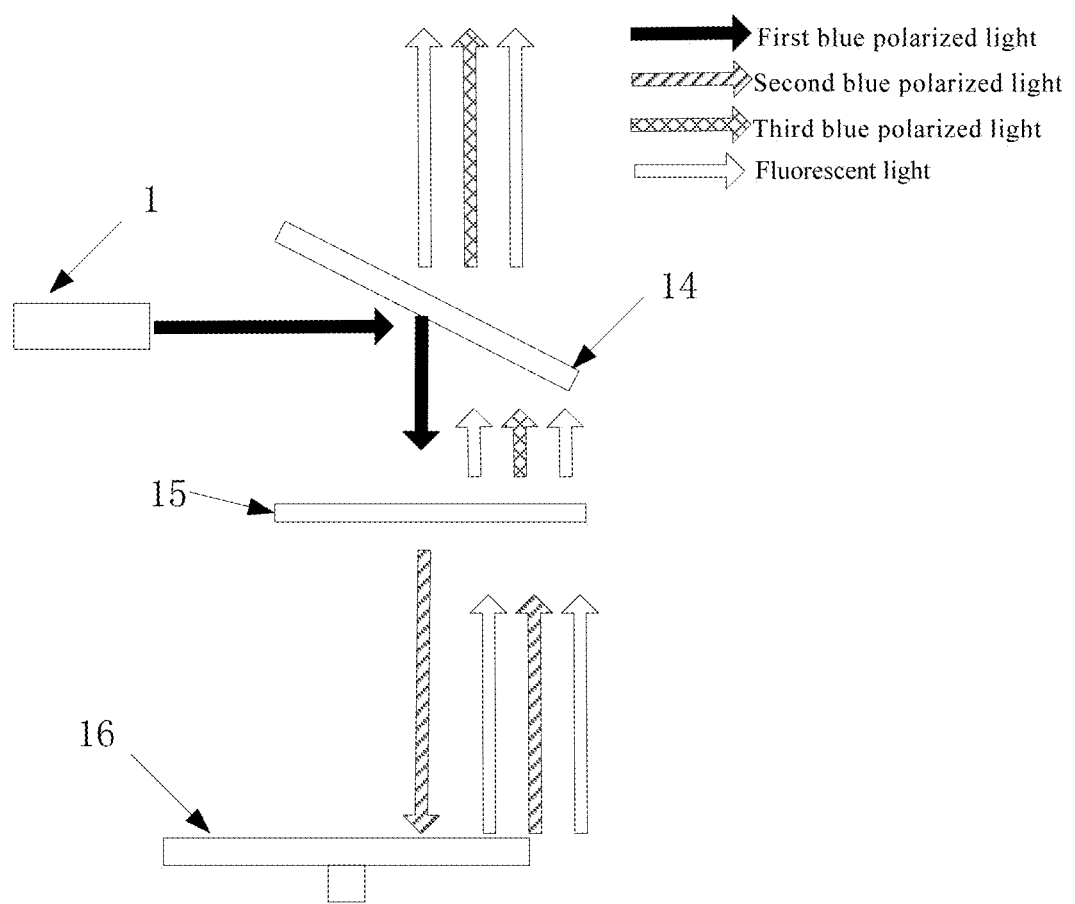
FIG. 10 shows a schematic structural diagram of a laser projection device provided in further embodiments of the present disclosure.

A laser projection device provided in further embodiments of the present disclosure differs from that in the embodiments of FIG. 2 in that, as shown in FIG. 10, the 1/4 wave plate 15 is disposed between the dichroic component 14 and reflective fluorescent wheel 16, the dichroic component 14 reflects the first blue polarized light emitted from the laser array 1 to the 1/4 wave plate 15, and transmits the third blue polarized light from the 1/4 wave plate 15, and transmits the fluorescent light generated when the second blue polarized light is irradiated to the fluorescent reflection region.

Figure 11:
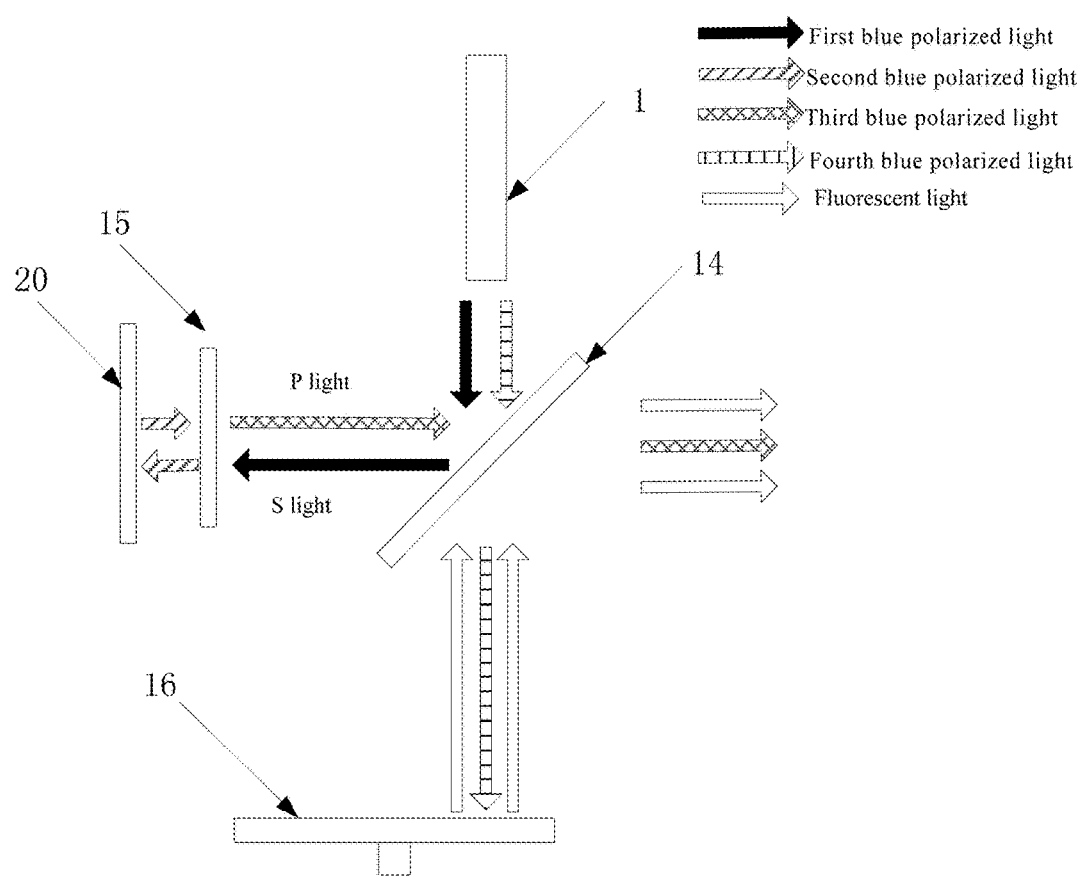
FIG. 11 shows a schematic structural diagram of a laser projection device provided in further embodiments of the present disclosure.

Further embodiments of the present disclosure provide a laser projection device, as shown in FIG. 11, including a laser array 1 that is configured to emit at least a first blue polarized light and a fourth blue polarized light, a reflective fluorescent wheel 16, a 1/4 wave plate 15, a reflector 20 which serves as a reflective member, and a dichroic component 14 disposed between the laser array 1 and the reflective fluorescent wheel 16. The dichroic component 14 is obliquely disposed between the laser array 1 and the reflective fluorescent wheel 16.

The 1/4 wave plate 15 is disposed at a side of the dichroic component 14 for receiving the first blue polarized light reflected by the dichroic component 14, and a transmission direction for a light path between the 1/4 wave plate 15 and the dichroic component 14 is perpendicular to a transmission direction for a light path between the laser array 1 and the reflective fluorescent wheel 16.

The reflector 20 is disposed at a side of the 1/4 wave plate 15 which is away from the dichroic component 14.

In the above laser projection device, the transmission path of the laser is as follows:

The laser array 1 is configured to emit at least a first blue polarized light and a fourth blue polarized light. In some embodiments, the laser array 1 may be a blue laser array, which may emit a first blue polarized light and a fourth blue polarized light.

The first blue polarized light and the fourth blue polarized light emitted from the laser array 1 are irradiated to the dichroic component 14, and the dichroic component 14 splits the first blue polarized light and the fourth blue polarized light, reflects the first blue polarized light to the 1/4 wave plate 15, and lets the fourth blue polarized light pass through and transmits the fourth blue polarized light to the reflective fluorescent wheel 16.

In some embodiments, the first blue polarized light may be P light or S light. Correspondingly, when the first blue polarized light is P light, the fourth blue polarized light is S light; and when the first blue polarized light is S light, the fourth blue polarized light is P light.

Adjustment to an angle between a plane where the dichroic component 14 is located and an incident direction of the first blue polarized light and the fourth blue polarized light emitted from the laser array 1 may adjust a ratio of the first blue polarized light transmitted by the dichroic component 14 to the fourth blue polarized light reflected by the dichroic component 14.

In some embodiments, powers of the first blue polarized light and the fourth blue polarized light emitted from the laser array 1 may be the same. In order to adapt to different projection display brightness and color requirements, it is possible to adjust the angle between the plane where the dichroic component is located and the incident direction of the first blue polarized light as desired, for example, the angle between the plane where the dichroic component is located and the incident direction of the first blue polarized light may be set to a range of 45° to 70°. When the angle is within the range of 45° to 70°, a proportion of the fourth blue polarized light split and obtained by the dichroic component 14 in the laser beam emitted from the laser array is greater than or equal to a proportion of the first blue polarized light, and the first blue polarized light may also satisfy the requirements for display brightness and color proportion.

In some embodiments, 45°-70° is a preferred range for the angle between the plane where the dichroic component 14 is located and the incident direction of the first blue polarized light, and the angle between the plane where the dichroic component 14 is located and the incident direction of the first blue polarized light may be selected as any angle according to actual conditions, which is not specifically limited herein.

In some embodiments, when the angle between the plane where the dichroic component 14 is located and the incident direction of the first blue polarized light is 45°, the first blue polarized light emitted from the laser array 1 is totally reflected, and the fourth blue polarized light is totally transmitted. Then, the ratio of the first blue polarized light to the fourth blue polarized light split and obtained by the dichroic component 14 is approximately 1:1. The ratio of the laser and the fluorescent light generated by the laser projection device may satisfy the requirements for display brightness and color proportion.

In some embodiments, when the angle between the plane where the dichroic component 14 is located and the incident direction of the received laser beam is 60°, the ratio of the first blue polarized light to the fourth blue polarized light split and obtained by the dichroic component 14 is approximately 1:2. The ratio of the laser to the fluorescent light generated by the laser projection device may bring about the best display brightness and color rendering.

In yet further embodiments, when the angle between the plane where the dichroic component 14 is located and the incident direction of the received laser beam is 70°, the ratio of the first blue polarized light to the fourth blue polarized light split and obtained by the dichroic component 14 is approximately 2:7. The ratio of the laser to the fluorescent light generated by the laser projection device may satisfy the requirements for display brightness and color proportion.

In some embodiments, in order to satisfy the requirements for display brightness and color proportion, the angle between the plane where the dichroic component 14 is located and the incident direction of the first blue polarized light may be set to a range of 55°-65°.

In some embodiments, the dichroic component 14 includes a substrate, and the substrate is provided with a coated layer at a side close to the laser array 1. The coated layer is configured to transmit the fourth blue polarized light and can reflect the first blue polarized light. The substrate is provided with a dichroic film at a side close to the reflective fluorescent wheel, and the dichroic film is configured to transmit the fourth blue polarized light and reflect the fluorescent light. Therefore, the dichroic component 14 not only can transmit the fourth blue polarized light and reflect the first blue polarized light, but also has a light path steering effect for the fluorescent light.

The dichroic component 14 reflects the first blue polarized light to the 1/4 wave plate 15. The 1/4 wave plate 15 may change the first blue polarized light by a 1/4 phase difference and form a second blue polarized light to transmit the second blue polarized light to the reflector 20. That is, after the first blue polarized light passes through the 1/4 wave plate 15, its polarization direction is rotated by 45° to generate a second blue polarized light and transmit the second blue polarized light to the reflector 20. The second blue polarized light obtained by the reflector 20 is reflected again to the 1/4 wave plate 15, and the 1/4 wave plate 15 may change the second blue polarized light by a 1/4 phase difference and generate a third blue polarized light. That is, the second blue polarized light is rotated by 45° in its polarization direction after passing through the 1/4 wave plate 15 to generate a third blue polarized light with a polarization direction perpendicular to the polarization direction of the first blue polarized light, and the third blue polarized light is transmitted to the dichroic component 14. The second blue polarized light includes circular polarized light, and the polarization direction of the third blue polarized light is the same as the polarization direction of the fourth blue polarized light emitted from the laser array 1.

In some embodiments, if the first blue polarized light is P light, when the P light passes through the 1/4 wave plate 15, a 1/4 phase difference change will occur and blue circular polarized light will be generated; the blue circular polarized light is reflected by the reflector 20 to the 1/4 wave plate 15 again, and is changed by a 1/4 phase difference after passing through the 1/4 wave plate 15 to generate S light.

The third blue polarized light emitted from the 1/4 wave plate 15 is irradiated on the dichroic component 14, because the dichroic component may transmit the fourth blue polarized light, and the polarization direction of the fourth blue polarized light is the same as the polarization direction of the third blue polarized light, therefore, the third blue polarized light is directly transmitted through the dichroic component 14, and is received by the display chip, thereby providing a blue laser to the display chip.

Figure 12:
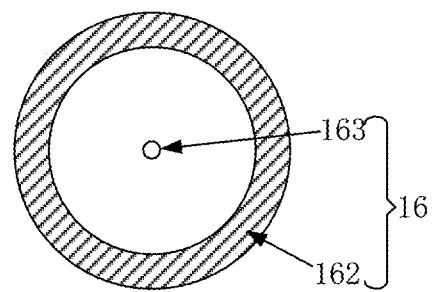
FIG. 12 shows a schematic structural diagram of a reflective fluorescent wheel provided in further embodiments of the present disclosure.

In a light path transmission direction of the laser array 1 and the reflective fluorescent wheel 16, the fourth blue polarized light split and obtained by the dichroic component 14 is transmitted to the reflective fluorescent wheel 16. As shown in FIG. 12, the reflective fluorescent wheel 16 may have a circular structure, which is provided with a rotating axis 163 at its central axis. A rotating plane of the reflective fluorescent wheel 16 is disposed perpendicular to the light beam of the incident second blue polarized light. A fluorescent reflection region 162 is provided along a circumferential direction of the reflective fluorescent wheel 16. The fluorescent reflection region 162 receives the fourth blue polarized light transmitted by the dichroic component 14, and a fluorescent light is excited and reflected to the dichroic component 14.

In some embodiments, the fluorescent reflection region 162 may be entirely coated with a yellow and green mixed phosphor, and when the third blue polarized light is irradiated onto the yellow and green mixed phosphor, a yellow fluorescent light and a green fluorescent light may be excited and reflected to the dichroic component 14.

In some embodiments of the present disclosure, the ratio of the yellow phosphor to the green phosphor in the yellow and green mixed phosphor needs to be greater than 1:1 because the efficiency for the blue laser to excite the green fluorescent light is greater than the efficiency to excite the yellow fluorescent light. In some embodiments, a ratio of yellow phosphor to green phosphor in the yellow and green mixed phosphor may be selected as 3:1 or 5:1, that is, a yellow and green mixed phosphor produced by mixing 3 parts of yellow phosphor and 1 part of green phosphor or a yellow and green mixed phosphor produced by mixing 5 parts of yellow phosphor and 1 part of green phosphor. Of course, 3:1 or 5:1 is a preferred ratio of the yellow phosphor to the green phosphor in the yellow and green mixed phosphor. The user may set the ratio of the yellow phosphor to green phosphor in the yellow and green mixed phosphor to be any ratio greater than 1:1 but less than 100:1 according to actual needs, which is not specifically limited herein.

In some embodiments of the present disclosure, when the fluorescent reflection region is entirely coated with the yellow and green mixed phosphor, the yellow fluorescent light and the green fluorescent light may be excited when the fourth blue polarized light is irradiated to the fluorescent reflection region. Since the first blue polarized light beam split by the dichroic component provides a blue laser to the display chip, the fourth blue polarized light excites the yellow fluorescent light and the green fluorescent light and provides them to the display chip. Therefore, the laser projection device can simultaneously provide lasers and fluorescent light to the display chip, that is, provide timing-free laser and fluorescent light to the display chip.

Figure 13:
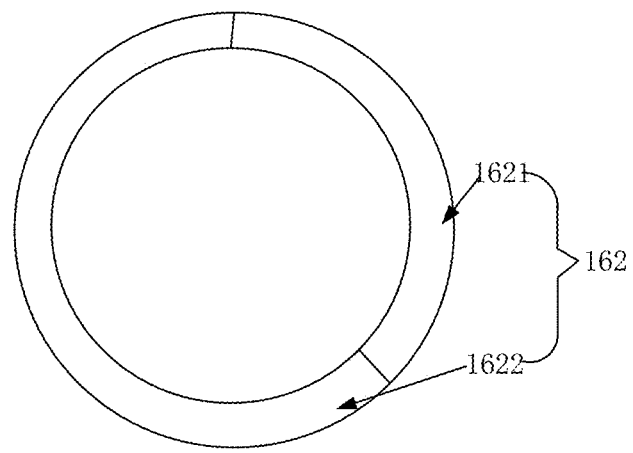
FIG. 13 shows a schematic structural diagram of a fluorescent reflection region provided in some embodiments of the present disclosure.

In other embodiments, as shown in FIG. 13, the fluorescent reflection region 162 of the reflective fluorescent wheel 16 includes a green fluorescent reflection region 1621 and a yellow fluorescent reflection region 1622, where the green fluorescent reflection region 1621 is provided with a green phosphor, and the yellow fluorescent reflection region 1622 is provided with a yellow phosphor.

During the rotation of the reflective fluorescent wheel 16, when the fourth blue polarized light is irradiated to the green fluorescent reflection region 1621, the fourth blue polarized light may excite the green phosphor to emit a green fluorescent light; when the fourth blue polarized light is irradiated to the yellow fluorescent reflection region 1622, the fourth blue polarized light may excite the yellow phosphor to emit a yellow fluorescent light. With the continuous rotation of the reflective fluorescent wheel 16, the yellow and green fluorescent light is constantly generated, steered by the dichroic component and provided to the display chip.

According to a laser projection device provided in some embodiments of the present disclosure, the first blue polarized light and the fourth blue polarized light emitted from the laser array are split at the dichroic component, where the first blue polarized light is reflected by the dichroic component to the 1/4 wave plate, which is rotated by 45° in its polarization direction after passing through the 1/4 wave plate, and the second blue polarized light is generated. The second blue polarized light is reflected by the reflector to the 1/4 wave plate again, which is rotated by 45° in its polarization direction after passing through the 1/4 wave plate to generate a third blue polarized light with its polarization direction perpendicular to the polarization direction of the first blue polarized light. The third blue polarized light is transmitted from the dichroic component to the display chip, thereby providing a blue laser to the display chip. The fourth blue polarized light split and obtained by the dichroic component is transmitted to the fluorescent reflection region on the reflective fluorescent wheel, and the phosphor is excited to generate a fluorescent light which is reflected to the dichroic component. The fluorescent light is reflected by the dichroic component to the display chip to provide the display chip with the fluorescent light. According to the laser projection device provided in some embodiments of the present disclosure, the dichroic component splits the first blue polarized light and the fourth blue polarized light emitted by the laser array, and the fourth blue polarized light excites the reflective fluorescent wheel to generate a fluorescent light, the first blue polarized light is emitted from the 1/4 wave plate to the reflector, which in turn reflects it to the 1/4 wave plate and the fluorescent light is sequentially transmitted to the display chip via the 1/4 wave plate and the dichroic component.

Figure 14:
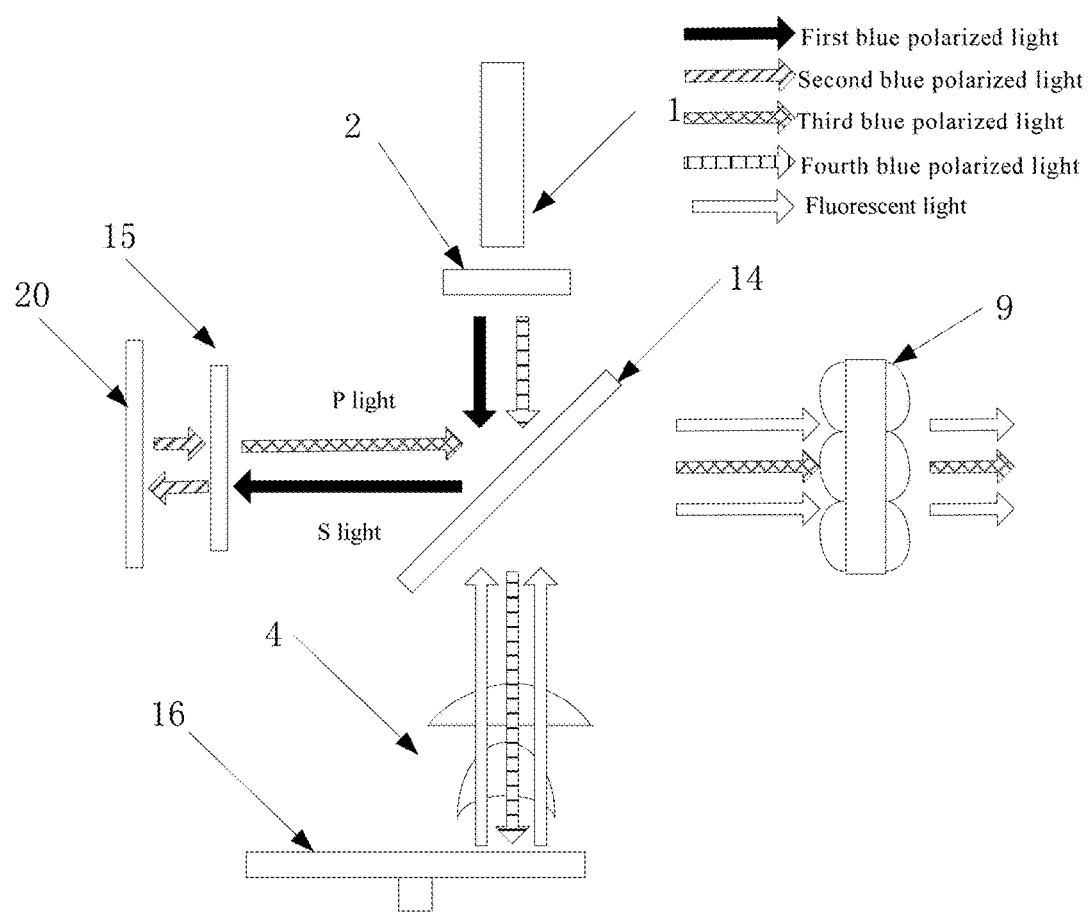
FIG. 14 shows a schematic structural diagram of a laser projection device provided in further embodiments of the present disclosure.

In some embodiments, as shown in FIG. 14, the laser projection device further includes a diffusion sheet 2 and a collimation component 4, where the diffusion sheet 2 is disposed between the laser array 1 and the dichroic component 14, and the collimation component 4 is disposed between the dichroic component 14 and the reflective fluorescent wheel 16.

The laser beam emitted by the laser array 1 including the first blue polarized light and the fourth blue polarized light is irradiated on the diffusion sheet 2, and the diffusion sheet 2 may convert the laser beam emitted from the laser array 1 into a circular Gaussian beam. The circular Gaussian beam is substantially parallel light. The diffusion sheet 2 transmits the circular Gaussian beam to the obliquely disposed dichroic component 14.

In some embodiments, the laser projection device further includes a homogenization component 9 disposed at a side of dichroic component 14 which is away from the 1/4 wave plate 15. The homogenization component 9 is configured to homogenize the third blue polarized light transmitted by the dichroic component 14 from the 1/4 wavelength plate 15; and is further configured to homogenize the fluorescent light reflected by the dichroic component 14. In some embodiments, the homogenization component 9 may be a fly-eye lens or a homogenized light stick.

Figure 15:
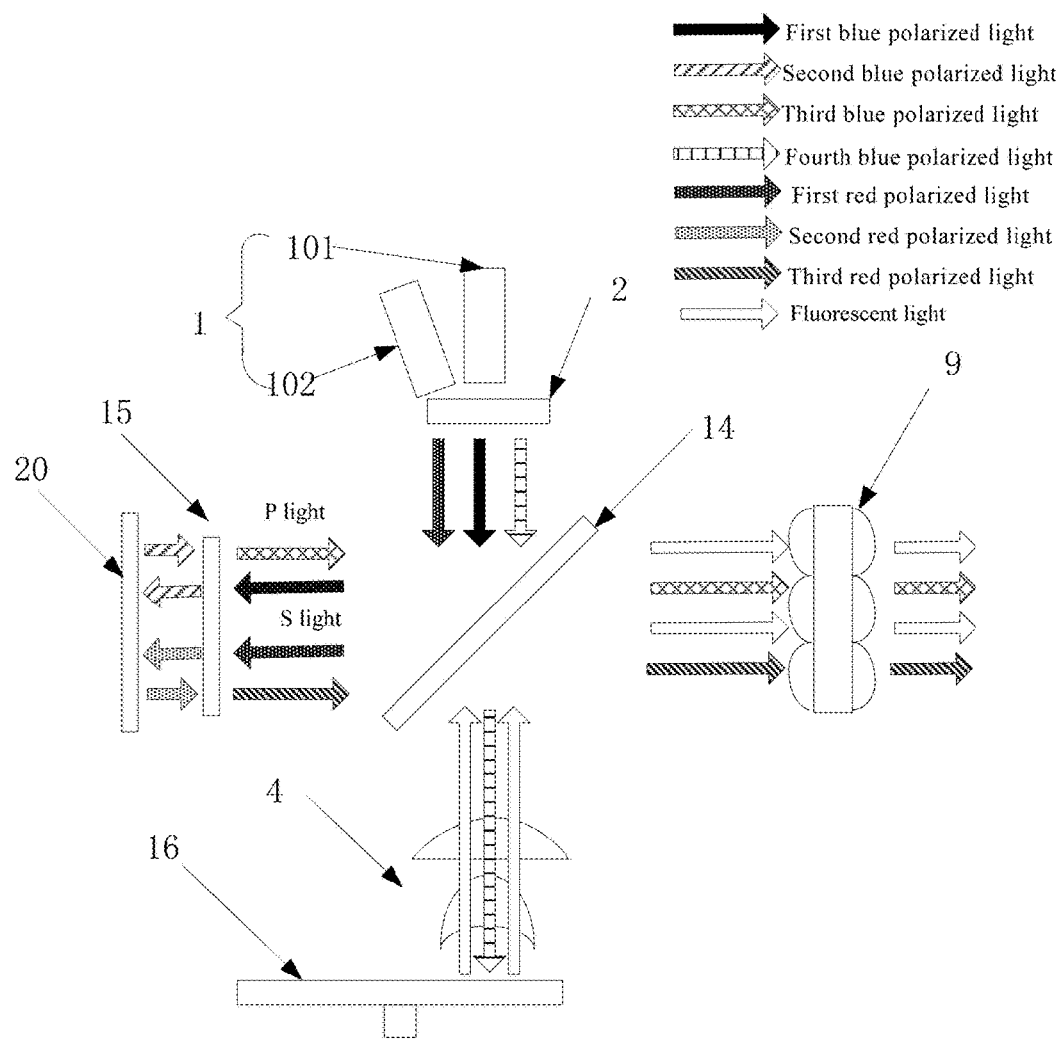
FIG. 15 shows a schematic structural diagram of a laser projection device provided in further embodiments of the present disclosure.

The laser projection device provided in further embodiments of the present disclosure differs from that in the embodiments of FIG. 11 in that the laser array 1 may further be configured to emit a first red polarized light. As shown in FIG. 15, the laser array 1 includes not only a blue laser array 101 emitting the first blue polarized light and the fourth blue polarized light, but also a red laser array 102 emitting the first red polarized light.

The first red polarized light emitted from the red laser array 102 is irradiated on the dichroic component 14, and the dichroic component 14 reflects the first red polarized light to the 1/4 wave plate 15. The 1/4 wave plate 15 receives the first red polarized light and rotates a polarization direction of the first red polarized light by 45° to generate a second red polarized light which is emitted to the reflector 20. The reflector 20 reflects the obtained second red polarized light to the 1/4 wave plate 15 again. The 1/4 wave plate 15 rotates a polarization direction of the second red polarized light by 45° to generate a third red polarized light with a polarization direction perpendicular to the polarization direction of the first red polarized light and emit it to the dichroic component 14. Since the dichroic component 14 may transmit the third red polarized light, the third red polarized light is directly transmitted out via the dichroic component 14 and received by the display chip, thereby providing a red laser to the display chip.

In some embodiments, the angle between an incident direction of the first red polarized light emitted from the red laser array and the plane where the dichroic component 14 is located can only be set to about 45°, so that the first red polarized light is totally reflected by the dichroic component 14 to the 1/4 wave plate 15, and then similar to the first blue polarized light, after passing through the 1/4 wave plate twice, the first red polarized light is rotated by 90° in its polarization direction, and the present red laser (the third red polarized light) is emitted out via the dichroic component.

In some embodiments, the first red polarized light may be P light or S light. Correspondingly, when the first red polarized light is P light, the third red polarized light is S light; and when the first red polarized light is S light, the third red polarized light is P light. It should be noted that the polarization directions of the first blue polarized light and the first red polarized light must be the same, that is, when the first blue polarized light is P light, the first red polarized light must be P light; and when the first blue polarized light is S light, the first red polarized light must be S light.

A laser projection device provided in some embodiments of the present disclosure differs from that in the embodiments of FIG. 11 in that the fluorescent reflection region 162 of the reflective fluorescent wheel of the laser projection device is entirely provided with green phosphor. When the fourth blue polarized light is irradiated to the green phosphor on the fluorescent reflection region 162, the green fluorescent light may be excited and reflected to the dichroic component 14. Due to the reflection effect of the dichroic films of the dichroic component 14 on the fluorescent light, the incident fluorescent light is totally reflected to the display chip, thereby providing the green fluorescent light to the display chip.

For the commonality between some embodiments of the present disclosure and the embodiments as shown in FIG. 11, reference may be made to the embodiments as shown in FIG. 11, and details are not described herein again.

According to a laser projection device provided in some embodiments of the present disclosure, the first blue polarized light and the fourth blue polarized light emitted from the laser array are split at the dichroic component, where the first blue polarized light is reflected by the dichroic component to the 1/4 wave plate, which is rotated by 45° in its polarization direction after passing through the 1/4 wave plate to generate a second blue polarized light. The second blue polarized light is reflected by the reflector to the 1/4 wave plate again, which is rotated by 45° in its polarization direction after passing through the 1/4 wave plate to generate a third blue polarized light with the polarization direction perpendicular to the polarization direction of the first blue polarized light. The third blue polarized light is transmitted from the dichroic component to the display chip, thereby providing a blue laser to the display chip. The fourth blue polarized light split and obtained at the dichroic component is transmitted to the fluorescent reflection region on the reflective fluorescent wheel, and the green phosphor is excited to generate a green fluorescent light which is reflected to the dichroic component. The green fluorescent light is reflected by the dichroic component to the display chip to provide the display chip with the green fluorescent light. The first red polarized light emitted from the laser array is reflected by the dichroic component to the 1/4 wave plate, which is rotated by 45° in its polarization direction after passing through the 1/4 wave plate to generate a second red polarized light. The second red polarized light is reflected by the reflector to the 1/4 wave plate again, which is rotated by 45° in its polarization direction after passing through the 1/4 wave plate to generate a third red polarized light with the polarization direction perpendicular to the polarization direction of the first red polarized light. The third red polarized light is transmitted from the dichroic component to the display chip, thereby providing a red laser to the display chip.

Figure 16:
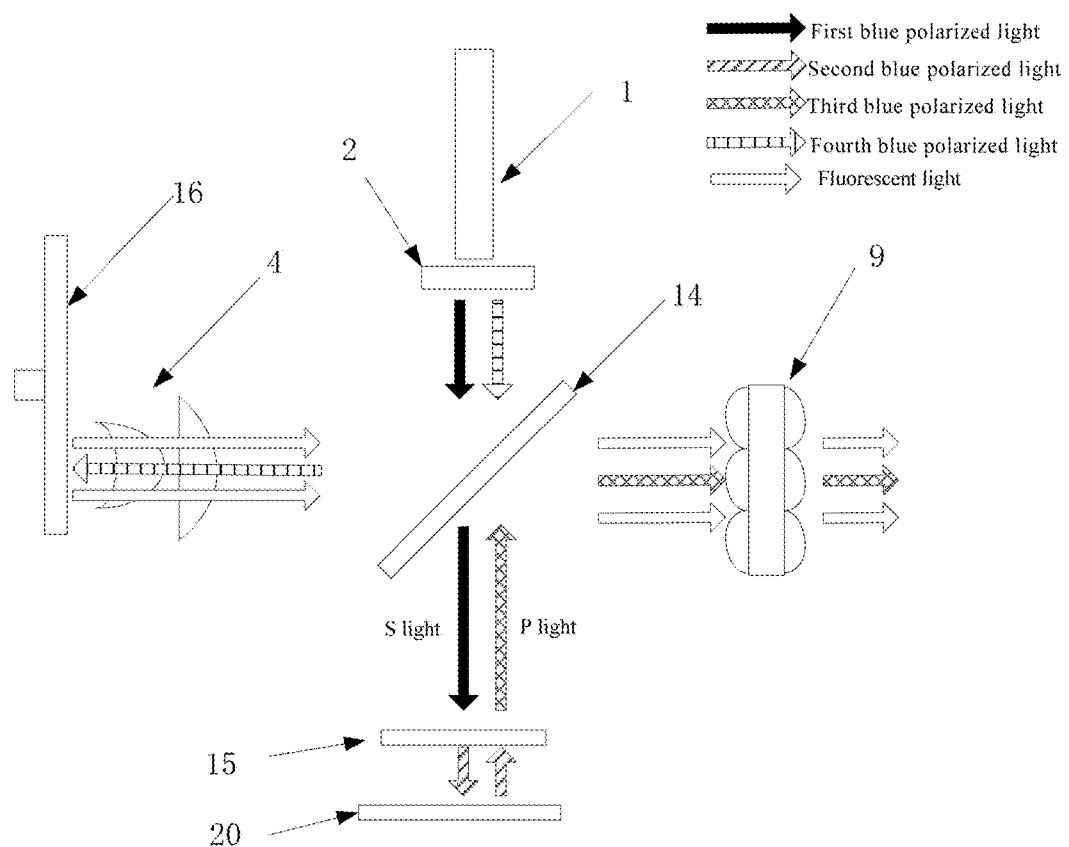
FIG. 16 shows a schematic structural diagram of a laser projection device provided in yet further embodiments of the present disclosure.

A laser projection device provided in yet further embodiments of the present disclosure differs from that in the embodiments of FIG. 14 in that, as shown in FIG. 16, the dichroic component 14 transmits the first blue polarized light emitted from the laser array 1 to the 1/4 wave plate 15, reflects the fourth blue polarized light emitted from the laser array 1 to the reflective fluorescent wheel 16, reflects the third blue polarized light from the 1/4 wave plate 15, and the dichroic component 14 transmits the fluorescent light generated.

Figure 17:
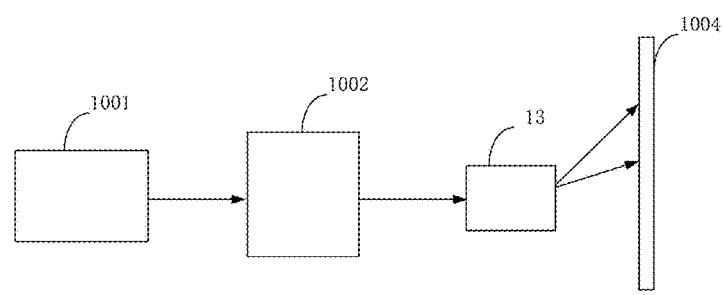
FIG. 17 shows a schematic structural diagram of a projection display device provided in some embodiments of the present disclosure.

Based on the above technical solutions, some embodiments of the present disclosure provide a projection display device, as shown in FIG. 17, including a light source 1001, a light machine 1002, a lens 13 and a projection screen 1004.

The light source comprise the laser array 1, the dichroic component 14, the 1/4 wave plate 15, the reflective fluorescent wheel 16 and so on in the above embodiments, the light machine 1002 comprise the display chip, light sources are mixed to form white light, and the laser and the fluorescent light are outputted in time sequence. The outputted laser and fluorescent light enter the light machine 1002. Taking the light machine composed of a DMD chip as an example, the DMD chip may be regarded as consisting of a plurality of multi-pole micro-reflectors that can be driven by the current to reverse within a certain range of angles in order to adjust the amount of light entering the lens, thereby presenting different colors on the projection screen 1004. The laser and the fluorescent light outputted by the laser projection device are modulated by the DMD chip and refracted for a plurality of times to converge to reach the imaging lens 13, which are finally imaged on the projection screen 1004.

In some embodiments, the light machine 1002 may also use a light machine composed of an LCD chip or an LCOS chip, and the user may select any of the above light machines according to actual conditions, which is not specifically limited herein.

According to a projection display device provided in some embodiments of the present disclosure, the laser projection device uses a design including a dichroic component, a 1/4 wave plate, and a reflective component. A dichroic component disposed on a light emitting path of the laser array receives a first blue polarized light from the laser array, the 1/4 wave plate receives the first blue polarized light from the dichroic component, and the first blue polarized light is rotated by 45° in its polarization direction to generate a second blue polarized light which is emitted to the reflective component. The reflective component receives the second blue polarized light from the 1/4 wave plate, and reflects it to the 1/4 wave plate. The 1/4 wave plate then receives the second blue polarized light reflected by the reflective component, and the second blue polarized light is rotated by 45° in its polarization direction to generate a third blue polarized light which is emitted to the dichroic component. The dichroic component receives the third blue polarized light from the 1/4 wave plate and a fluorescent light from the reflective fluorescent wheel, and outputs the third blue polarized light and the fluorescent light in a same light emitting direction. The dichroic component transmits one of the first blue polarized light and the third blue polarized light and can reflect the other of the first blue polarized light and the third blue polarized light.

Reference may be made to the embodiments in this specification for the same or similar parts between each other.

Persons skilled in the art will readily recognize other embodiments of the present disclosure upon consideration of the specification and practice of the disclosure herein. This application is intended to cover any variations, uses, or adaptations of the present disclosure which follow the general principles of the present disclosure and include any common knowledge or customary technical means in the art not disclosed in the present disclosure. The specification and examples are to be considered exemplary only, and the true scope and spirit of the present disclosure is subject to the appended claims.

The embodiments of the present disclosure described above do not limit the scope of the present disclosure.

What is claimed is:

1. A laser projection device comprising a laser array that is configured to emit at least a first blue polarized light, a reflective fluorescent wheel, a reflective component, a dichroic component disposed on a light path between the laser array and the reflective fluorescent wheel, and a 1/4 wave plate disposed between the reflective component and the dichroic component;
   wherein the dichroic component is disposed on a light emitting path of the laser array for receiving the first blue polarized light from the laser array;
   the 1/4 wave plate is configured to receive the first blue polarized light from the dichroic component, generate a second blue polarized light, and emit the second blue polarized light to the reflective component; and is further configured to receive the second blue polarized light reflected by the reflective component, generate a third blue polarized light, and emit the third blue polarized light to the dichroic component;
   the dichroic component is further configured to receive the third blue polarized light from the 1/4 wave plate and a fluorescent light from the reflective fluorescent wheel, and output the third blue polarized light and the fluorescent light in a same light emitting direction;
   wherein polarization directions of the first blue polarized light and the third blue polarized light are perpendicular, and the dichroic component transmits one of the first blue polarized light and the third blue polarized light and can reflect the other of the first blue polarized light and the third blue polarized light;
   wherein the laser array is further configured to emit a fourth blue polarized light, and a polarization direction of the fourth blue polarized light is the same as the polarization direction of the third blue polarized light, the reflective component is a reflector, and the reflective fluorescent wheel is provided with a fluorescent reflection region;
   the 1/4 wave plate is configured to receive the first blue polarized light reflected by the dichroic component;
   the reflective fluorescent wheel is excited by the fourth blue polarized light that is transmitted by the dichroic component to generate the fluorescent light; and the dichroic component is further configured to transmit the third blue polarized light from the 1/4 wave plate and can reflect the fluorescent light;

wherein the laser array is further configured to emit a first red polarized light;

the 1/4 wave plate is further configured to receive the first red polarized light reflected by the dichroic component, generate a second red polarized light, and emit the second red polarized light to the reflective component; and is further configured to receive the second red polarized light reflected by the reflector, generate a third red polarized light, and emit the third red polarized light to the dichroic component; and the dichroic component is configured to transmit the third red polarized light.

2. The laser projection device of claim 1, wherein the dichroic component comprises a substrate provided with a coated layer at a side close to the laser array and a dichroic film at a side close to the reflective fluorescent wheel, wherein the coated layer is configured to transmit the third blue polarized light from the 1/4 wave plate and the fourth blue polarized light from the laser array, and can reflect the first blue polarized light; and the dichroic film is configured to transmit the third blue polarized light from the 1/4 wave plate and the fourth blue polarized light from the laser array, and can reflect the fluorescent light from the fluorescent reflection region.

3. The laser projection device of claim 2, wherein an angle between a plane in which the dichroic component is located and an incident direction of the first blue polarized light is 45°-70°.

4. The laser projection device of claim 3, wherein an angle between the plane in which the dichroic component is located and an incident direction of the first blue polarized light is 60°.

5. The laser projection device of claim 1, wherein an angle between the plane in which the dichroic component is located and an incident direction of the first red polarized light is 45°.

6. The laser projection device of claim 1, wherein the fluorescent reflection region is provided with a phosphor mixed with yellow and green colors.

7. A laser projection device comprising a laser array that is configured to emit at least a first blue polarized light, a reflective fluorescent wheel, a reflective component, a dichroic component disposed on a light path between the laser array and the reflective fluorescent wheel, and a 1/4 wave plate disposed between the reflective component and the dichroic component;

wherein the dichroic component is disposed on a light emitting path of the laser array for receiving the first blue polarized light from the laser array;

the 1/4 wave plate is configured to receive the first blue polarized light from the dichroic component, generate a second blue polarized light, and emit the second blue polarized light to the reflective component; and is further configured to receive the second blue polarized light reflected by the reflective component, generate a third blue polarized light, and emit the third blue polarized light to the dichroic component;

the dichroic component is further configured to receive the third blue polarized light from the 1/4 wave plate and a fluorescent light from the reflective fluorescent wheel, and output the third blue polarized light and the fluorescent light in a same light emitting direction;

wherein polarization directions of the first blue polarized light and the third blue polarized light are perpendicular, and the dichroic component transmits one of the first blue polarized light and the third blue polarized light and can reflect the other of the first blue polarized light and the third blue polarized light;

wherein the laser array is further configured to emit a fourth blue polarized light, and a polarization direction of the fourth blue polarized light is the same as the polarization direction of the third blue polarized light, the reflective component is a reflector, and the reflective fluorescent wheel is provided with a fluorescent reflection region;

the 1/4 wave plate is configured to receive the first blue polarized light transmitted by the dichroic component;

the reflective fluorescent wheel is excited by the fourth blue polarized light that is reflected by the dichroic component from the laser array to generate the fluorescent light, and the dichroic component is further configured to reflect the third blue polarized light from the 1/4 wave plate and transmit the fluorescent light;

wherein said laser array is further configured to emit a first red polarized light;

the 1/4 wave plate is further configured to receive the first red polarized light transmitted by the dichroic component, generate a second red polarized light, and emit the second red polarized light to the reflective component; and is further configured to receive the second red polarized light reflected by the reflector, generate a third red polarized light, and emit the third red polarized light to the dichroic component; and the dichroic component is configured to reflect the third red polarized light.

8. A laser projection device comprising a laser array that is configured to emit at least a first blue polarized light, a reflective fluorescent wheel, a reflective component, a dichroic component disposed on a light path between the laser array and the reflective fluorescent wheel, and a 1/4 wave plate disposed between the reflective component and the dichroic component;

wherein the dichroic component is disposed on a light emitting path of the laser array for receiving the first blue polarized light from the laser array;

the 1/4 wave plate is configured to receive the first blue polarized light from the dichroic component, generate a second blue polarized light, and emit the second blue polarized light to the reflective component; and is further configured to receive the second blue polarized light reflected by the reflective component, generate a third blue polarized light, and emit the third blue polarized light to the dichroic component;

the dichroic component is further configured to receive the third blue polarized light from the 1/4 wave plate and a fluorescent light from the reflective fluorescent wheel, and output the third blue polarized light and the fluorescent light in a same light emitting direction;

wherein polarization directions of the first blue polarized light and the third blue polarized light are perpendicular, and the dichroic component transmits one of the first blue polarized light and the third blue polarized light and can reflect the other of the first blue polarized light and the third blue polarized light;

wherein the reflective component is a laser reflection region on the reflective fluorescent wheel, and the reflective fluorescent wheel further comprises a fluorescent reflection region, the dichroic component and the 1/4 wave plate are sequentially disposed in a light path between the laser array and the reflective florescent wheel;

the 1/4 wave plate is configured to receive the first blue polarized light transmitted by the dichroic component and generate the second blue polarized light;

the laser reflection region is configured to receive the second blue polarized light from the 1/4 wave plate and reflect the second blue polarized light to the 1/4 wave plate;

the fluorescent reflection region is configured to receive the second blue polarized light from the 1/4 wave plate and is excited by the second blue polarized light to generate the fluorescent light;

the 1/4 wave plate is further configured to receive the second blue polarized light reflected by the laser reflection region, generate the third blue polarized light, and receive and transmit the fluorescent light;

the dichroic component is configured to reflect the third blue polarized light from the 1/4 wave plate and reflect the fluorescent light;

wherein the laser array is further configured to emit a first red polarized light;

the 1/4 wave plate is further configured to receive the first red polarized light transmitted by the dichroic component, generate a second red polarized light, and emit the second red polarized light to the reflective component; and is further configured to receive the second red polarized light reflected by the laser reflection region, generate a third red polarized light, and emit the third red polarized light to the dichroic component; and the dichroic component is configured to reflect the third red polarized light.

9. The laser projection device of claim 8, wherein the laser projection device further comprises a homogenization component disposed between the 1/4 wave plate and the reflective fluorescent wheel, the homogenization component is configured to homogenize the second blue polarized light and the fluorescent light from the fluorescent reflection region.

10. The laser projection device of claim 9, wherein the homogenization component comprises a double-sided fly-eye lens.

11. The laser projection device of claim 10, wherein a length and a width of a single lens in the double-sided fly-eye lens and a thickness of the double-sided fly-eye lens satisfy: $a/c<0.2$, $b/c<0.2$, wherein a is the length of the single lens, b is the width of the single lens, and c is the thickness of the double-sided fly-eye lens.

12. The laser projection device of claim 10, wherein the homogenization component comprises two single-sided fly-eye lenses arranged in sequence, wherein a convex surface of one of the single-sided fly-eye lenses faces the 1/4 wave plate, and a convex surface of the other of the single-sided fly-eye lenses faces the reflective fluorescent wheel.

13. The laser projection device of claim 12, wherein a length and a width of a single lens in the single-sided fly-eye lenses and an interval between the convex surfaces of the two single-sided fly-eye lenses satisfy: $d/f<0.2$, $e/f<0.2$, wherein d is the length of the single lens in the single-sided fly-eye lenses, e is the width of the single lens in the single-sided fly-eye lenses, and f is the interval between the convex surfaces of the two single-sided fly-eye lenses.

14. The laser projection device of claim 9, wherein the laser projection device further comprises a first lens group disposed between the laser array and the dichroic component, a second lens group disposed between the dichroic component and the 1/4 wave plate and a third lens group disposed in a light emitting direction of the dichroic component.

15. A laser projection device comprising a laser array that is configured to emit at least a first blue polarized light, a reflective fluorescent wheel, a reflective component, a dichroic component disposed on a light path between the laser array and the reflective fluorescent wheel, and a 1/4 wave plate disposed between the reflective component and the dichroic component;

wherein the dichroic component is disposed on a light emitting path of the laser array for receiving the first blue polarized light from the laser array;

the 1/4 wave plate is configured to receive the first blue polarized light from the dichroic component, generate a second blue polarized light, and emit the second blue polarized light to the reflective component; and is further configured to receive the second blue polarized light reflected by the reflective component, generate a third blue polarized light, and emit the third blue polarized light to the dichroic component;

the dichroic component is further configured to receive the third blue polarized light from the 1/4 wave plate and a fluorescent light from the reflective fluorescent wheel, and output the third blue polarized light and the fluorescent light in a same light emitting direction;

wherein polarization directions of the first blue polarized light and the third blue polarized light are perpendicular, and the dichroic component transmits one of the first blue polarized light and the third blue polarized light and can reflect the other of the first blue polarized light and the third blue polarized light;

wherein the reflective component is a laser reflection region on the reflective fluorescent wheel, the reflective fluorescent wheel further comprises a fluorescent reflection region, and the 1/4 wave plate is disposed on a light path between the dichroic component and the reflective fluorescent wheel;

the 1/4 wave plate is configured to receive the first blue polarized light reflected by the dichroic component and generate the second blue polarized light;

the laser reflection region is configured to receive the second blue polarized light from the 1/4 wave plate and reflect the second blue polarized light to the 1/4 wave plate;

the fluorescent reflection region is configured to receive the second blue polarized light from the 1/4 wave plate and is excited by the second blue polarized light to generate the fluorescent light;

the 1/4 wave plate is further configured to receive the second blue polarized light reflected by the laser reflection region, generate the third blue polarized light, and receive and transmit the fluorescent light; and the dichroic component is configured to transmit the third blue polarized light from the 1/4 wave plate and transmit the fluorescent light;

wherein the laser array is further configured to emit a first red polarized light;

the 1/4 wave plate is further configured to receive the first red polarized light reflected by the dichroic component, generate a second red polarized light, and emit the second red polarized light to the reflective component; and is further configured to receive the second red polarized light reflected by the laser reflection region, generate a third red polarized light, and emit the third red polarized light to the dichroic component; and the dichroic component is configured to transmit the third red polarized light.

* * * * *